Jan. 3, 1928. 1,655,327
W. H. MORGAN, SR
METHOD OF PREPARING SUGAR CANE FOR EXTRACTING JUICE FROM CANE STALKS
Filed Aug. 19. 1925   2 Sheets-Sheet 1
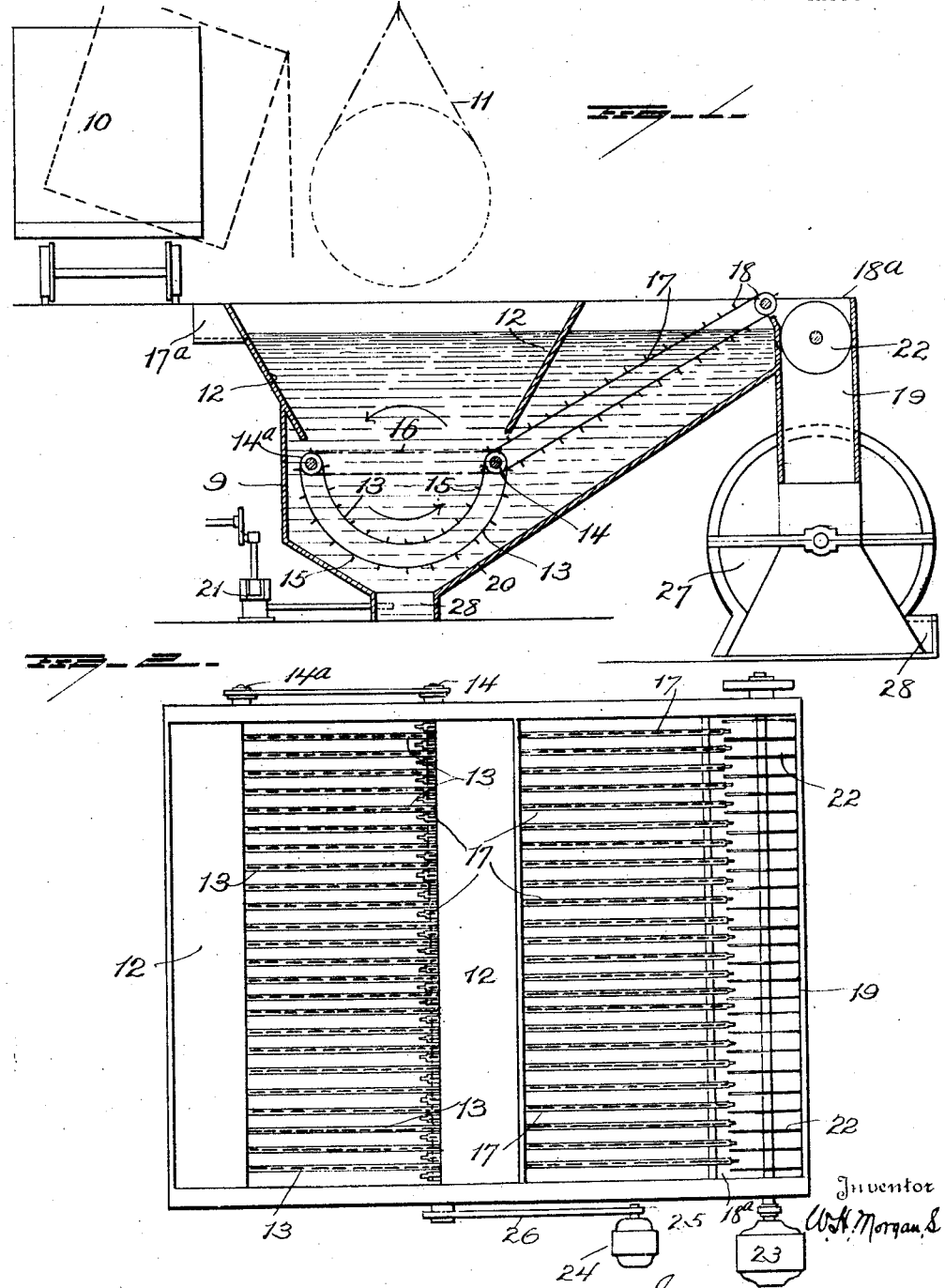

Jan. 3, 1928.
W. H. MORGAN, SR
1,655,327
METHOD OF PREPARING SUGAR CANE FOR EXTRACTING JUICE FROM CANE STALKS
Filed Aug. 19 1925
2 Sheets-Sheet 2
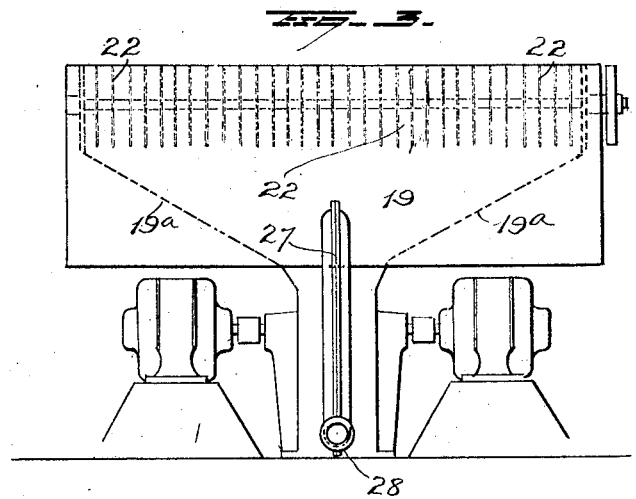
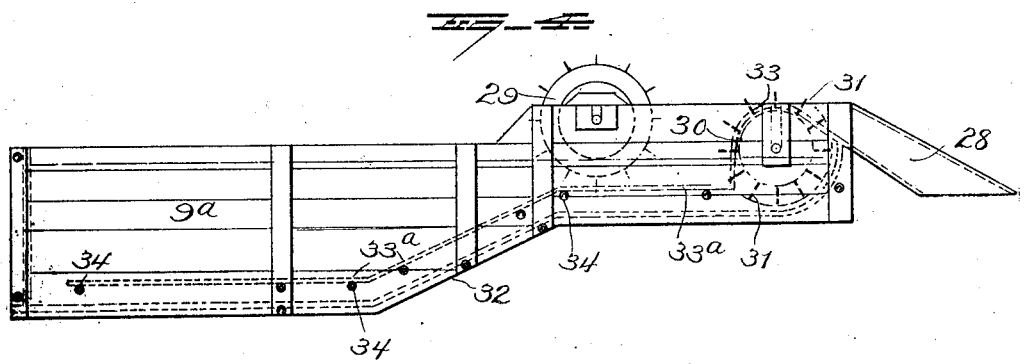
Inventor
W. H. Morgan, Sr.
By Seymour & Bright
Attorney Patented Jan. 3, 1928.

1,655,327

UNITED STATES PATENT OFFICE.

WILLIAM HENRY MORGAN, SR., OF ALLIANCE, OHIO, ASSIGNOR TO WILLIAM H. MORGAN, JR., OF ALLIANCE, OHIO.

METHOD OF PREPARING SUGAR CANE FOR EXTRACTING JUICE FROM CANE STALKS.

Application filed August 19, 1925. Serial No. 51,091.

My invention relates to a method of preparing sugar cane for extracting juice from cane stalks.

The universal practice in extracting cane juice is to first crush the stalks and then pass the crushed stalks through a series of juice extracting rolls or units. The cane as it is fed to the crusher or pre-crusher is coated with a thin wax like substance and carries more or less dirt and other matter which contaminates the juice, and makes it necessary to purify it before it can be converted into sugar. Again parts of leaves and more or less trash pass with the stalks through the crushing and extracting rolls and assist in fouling the juice. Also stones and tramp metal are carried in with the cane and cause breakage of rolls and machinery.

The object of my invention is to provide a method for cleansing the cane, and automatically feeding the cleansed cane to a pre-crusher and juice extracting rolls or to other apparatus for putting the cane in condition for the extraction of the juice therefrom.

A further object is to provide a method for washing or otherwise cleansing the stalk, automatically cutting the stalks into short lengths and automatically feeding the cut stalks to disintegrating or crushing apparatus preparatory to the extraction of the juice therefrom.

A further object is to wash or otherwise clean the stalks; separate the leaves and trash from the stalks, and automatically convey the cleansed stalks to an apparatus for disintegrating or crushing the same preparatory to the extraction of the juice or sugar content therefrom.

With these and other objects in view my invention consists in a method of cleaning cane stalks to remove bacteria and dirt therefrom preparatory to subjecting the stalks to juice extracting devices.

My invention further consists in cutting the cleaned stalks into short lengths and then shearing or disintegrating the cleaned stalks preparatory to extracting the juice therefrom.

My invention further consists in certain details as will be more fully described and pointed out in the claims.

In the accompanying drawings,

Figure 1 is a diagrammatic view in side elevation of one form of apparatus for carrying out my invention;

Figure 2 is a plan view of the same, and

Figure 3 is a view in front elevation and

Figure 4 is a modified form.

Two forms of apparatus for carrying out my method are shown in the accompanying drawings.

In the construction shown in Figures 1, 2 and 3, 9 represents a hopper which may be located below the floor level as shown so that the contents of a cane car 10 can be dumped therein without handling or bundling the cane, or into which bundles of cane carried by a sling 11 from an overhead crane, may be readily deposited. The position of this hopper however is not important except that if it be located on the floor instead of in a pit in the floor, the cane cannot be dumped directly into the same from a cane car as shown in Figure 1. This hopper preferably has inclined ends 12 which direct the cane stalks onto the loop shaped conveyor 13 located adjacent the bottom of the hopper. This conveyor 13 consists preferably of a series of endless and preferably sprocket chains, each of which is provided with a series of fingers 15 which positively move the cane stalks in the direction indicated by the arrows. The chains or loop shaped conveyor 13 mounted in loop form as shown and the two shafts 14 and 14ª carrying and supporting same are connected by a drive belt 16 or chain shown in Figure 2 so that they rotate in unison and operate to maintain the conveyor in loop form, or prevent the upper members of the chain from straightening out, which would, or might happen if any undue friction were exerted on an idle shaft 14ª. This hopper is filled with water or other cleansing fluid to a point near the top as indicated in Figure 1, an overflow spout 17ª being provided for the free discharge of leaves and all trash, the specific gravity of which is less than water, the hopper being kept filled with water supplied to replace the overflow.

One of the shafts, preferably 14, is positively driven by a motor, belt or other source of power, and the cane stalks as they are dumped into the hopper fall onto the loop conveyer and are rotated or moved in the direction indicated by the arrows. This immersion of the cane stalks in water, and the rumbling movement or attrition of the cane stalks while thus submerged, operate to remove the waxy substance covering the stalks and also all sand and dirt adhering to the stalks and allows heavy pieces such as stones or tramp metal to fall away from the cane.

Preferably connected to or mounted on the shaft 14 is an inclined endless conveyor 17. This conveyor is nearly wholly submerged in the cleansing fluid in the hopper 9, and is so located to receive the stalks carried around on the loop shaped conveyor and carry them up to the hopper 18 located at the upper end of the chute 19. It will therefore be seen that, the stalks, in addition to the washing and rumbling or attrition to which they are subjected while being carried around on the loop shaped conveyor, are also subjected to the cleansing action of the water or other fluid while on the inclined conveyor 17, so that by the time the stalks are discharged into the hopper 18 they have been thoroughly washed and will be substantially free of dirt and other matter which would contaminate the juice.

The bottom 20 of the hopper 9 is inclined, and is provided at its lowest point with a pipe connected with a pump 21 for removing all the dirt washed from the stalks. The conveyors 14 and 17 are preferably composed of chains alternately arranged as in Figure 2 and the stalks as they are discharged from conveyor 17, fall onto the circular saws 22 which in the construction shown in Figures 1, 2 and 3 are located within hopper 18 at the upper end of the chute 19. These saws are designed to cut the cleansed stalks into short lengths approximately six inches in length, and are preferably driven by a motor 23. The conveyor 17 and the loop conveyor 14 may be actuated by a motor 24 and belt or chain 26 connecting the shafts 14, as shown in Figure 2, and as the two are connected and operate by a single motor their movement is necessarily in unison.

If desired the full length stalks may be cleaned in the apparatus above described and then fed to a pre-crusher and juice extracting apparatus which forms no part of this invention.

When however the cane is cut into short lengths the cut sections of the stalks, as they leave the saws 22 fall by gravity down the chute 19, which latter, at its top, is as wide as the saw hopper is long. The bottom of the hopper 19ª tapers as shown in Figure 3, and feeds the cut stalks to a disintegrator 27 at or near the center thereof, as shown in my application Serial Number 12,410 filed February 28th, 1925, or it may be fed by a conveyor to the ordinary pre-crusher and juice extracting rolls now universally used. The movable disk of the disintegrator, not shown, is preferably actuated by two motors either of which would be sufficient to continue the operation in the event one should fail.

If the disintegrator be used, the disintegrated or sheared stalks will be discharged by an air blast and centrifugal force through the discharge outlet 28, to juice extracting rolls. If the cleansing of the whole stalks be done by a separate unit as shown in Figure 4, the stalks will be ejected from the washer and cleanser through the discharge spout 28 onto a conveyor or other means for carrying it to a pre-crusher or to the disintegrator or shearing machine one form of which is shown and referred to in Figures 1, 2 and 3.

In the construction shown in Figure 4, either whole or cut stalks are dumped into the water tank 9ª, which is constructed with an opening and spout if desired at its front for the escape of leaves and all trash the specific gravity of which is lighter than water. This tank is provided intermediate its ends with a paddle wheel 29 which rotates in a direction to carry the stalks toward the elevating roll 30, which latter is provided throughout its length with a series of radial fingers 31. The paddle wheel 29, and elevating roll 30 are partly submerged, and the paddle wheel 29 not only operates to create a circulation of water or other fluid in the tank, but also forces the cane toward the roller 30 where it is picked up by the lifting fingers and deposited in the discharge outlet 28. The circulation of the water toward the lifting wheel would tend to carry the leaves and other trash toward the lifting wheel, hence it may be necessary for a laborer standing at the side of the tank to remove the floating trash or propel it toward the outlet which as before stated is on a line with the water level. The tank is made deeper at its front end, and its bottom is inclined upwardly intermediate its ends as shown at 32 in Figure 4.

Surrounding the lifting roller 30 is a series of bars 33, which are separated sufficiently for the free movement of the lifting fingers but too close to prevent the passage of stalks either whole or section to pass between them. These bars terminate at one end at the discharge outlet 28, and at the other, at the rear end of the diaphragm 33ª and partly embrace the lifting wheel. The diaphragm 33ª is located, above and preferably parallel with the bottom of the tank 9ª, and terminates at its front end a short distance from the front end of the tank. This diaphragm 33 rests on or is secured by bolts or rods 34 so as to maintain its proper relationship in the tank.

With this construction the fluid in the tank is kept in motion by the paddle wheel 29, which carries the stalks, whole or cut into sections toward the lifting fingers 31 which pick them up and deposit them in the discharge outlet through which they are conveyed to a disintegrator or shearing apparatus if the latter be used, or to the precrusher if the apparatus now in general use be used. The flow of fluid will be through the tank and back under the diaphragm to the front end thereof and then up to a point above the diaphragm into which the stalks are dumped.

The specific gravity of the cane is slightly greater than that of water so that the tendency of the cane will be to form in a loose mass or bundle, down into the looped conveyor or into the tank of Figure 4. This puts a minimum load on the conveyor chains, and in the construction shown in Figures 1, 2 and 3 the bundle will be rotated by the looped conveyor thus causing the canes to rub against one another which strips off adhering leaves or parts thereof and removes all foreign matter such as sand or dirt. The dirt and leaves adhering to the stalks are contaminated by bacteria from the fertilizer used and from the weeds and other vegetation in the fields, and if this passes into the juice stream, it will tend to cause inversion of the juice and turn the sucrose of the same into another form of sugar known as glucose. This latter material will not crystallize into marketable sugar, consequently is lost, or passes out as a by-product. By keeping the juice uncontaminated a greater quantity of sugar can be extracted therefrom.

Again the washing and attrition of the cane stalks, either whole or cut into sections, rids the stalks of all sand or grit which would otherwise be carried into the rolls and result in an abrasive action on the extracting rolls, which would eventually wear them smooth thus preventing the proper gripping action, as well as wearing out bearings, pump packing, etc. The removal of stones and pieces of metal prevents these from passing into the disintegrator or rolls causing damage.

Where a disintegrator, of any design, which will shear the cane into hay like formation is used, the resultant product is a spongy fibrous mass with the cane juice or sugar content therein. This spongy, hay like mass may be immediately conveyed to juice extracting means, or it may be dried and bundled and stored for future extraction of the juice. When bundled it may be shipped any distance to a sugar factory where the subsequent process of extracting the juice may be carried out. This has the advantage of permitting the milling of the cane to be done in small scattered plants, which need not have the facilities for extracting the juice. It also permits the storing up of the dried material should the capacity of the milling plant be in excess of the remainder of the factory. The dried material is comparatively light in weight owing to the fact that the moisture has been removed.

Shearing or disintegrating the stalks ruptures the cells, and while the water will be withdrawn by evaporation the sucrose will, as above stated, remain in the spongy mass. Again drying will kill the bacteria which cause inversion, and the baled products can be used throughout the year, thus permitting the use of much smaller sugar plants than those now used in extracting the juice under the present practice, where the cane is harvested and immediately subjected to juice extracting apparatus and evaporation. At the present time the entire crop must be harvested, evaporated, crystallized, etc., within five to six months, the mills being idle the balance of the time. With my process I can rapidly or intensively harvest the cane, thus taking advantage of the time where there is the greatest percentage of sucrose in the cane, and dry and evaporate it throughout the year, thus greatly decreasing the size and cost of the plant necessary to take care of the entire crop.

Again the dried material is about twenty (20) per cent of the weight of freshly harvested cane, owing to the fact that the moisture or water has been removed, consequently it can be transported at a minimum of expense and without the loss of sucrose.

After the juice has been removed the bagasse is in perfect shape for burning and can be used in the furnaces as a fuel for supplying power, and is also in condition for making artificial wood, plaster board and similar products.

Cane thus sheared and dried will yield more sucrose and less glucose, or in other words, more crystal sugar and less molasses. It also eliminates the loss of sucrose in the mud and molasses.

In my process it is not necessary to use filter presses or drying rolls as I extract the mud and other foreign material before it enters the juice thus eliminating the expense and losses above enumerated.

Having fully described my invention what I claim as new and desire to secure by Letters-Patent, is:—

1. The method of preparing sugar cane preparatory to extracting the juice therefrom, consisting in immersing the cane stalks in a cleansing fluid and rumbling the stalks to remove the dirt and other foreign matter by washing and attrition then removing the cane stalks from the fluid and cutting them into short lengths, the several steps being performed automatically and without any manual handling of the cane.

2. The method of preparing sugar cane for the ready extraction of the juice therefrom, consisting in immersing the cane stalks in a cleansing fluid, moving the stalk while in the fluid to remove the dirt or other foreign matter, by the action of the fluid and attrition, automatically discharging the full length stalk from the cleansing fluid and cutting them into short sections, and finally shearing or shredding the short length stalks into a fibrous hay-like mass, the several steps in the process being automatic or without any manual handling of the same after it has been deposited in the cleansing fluid.

3. The method of cleansing sugar cane preparatory to extracting the juice therefrom consisting in depositing the cane in a fluid, rotating or rumbling the cane to wash the same and remove all foreign matter by contact of the stalks with one another and finally discharging the cleansed stalks from the fluid.

4. The method of preparing sugar cane preparatory to extracting the juice therefrom consisting in depositing the cane in a fluid, rotating or rumbling the cane to wash the same and remove all foreign matter by contact of the stalks with one another, discharging the stalks from the fluid, and finally cutting the cleansed stalks into short lengths.

5. The method of preparing sugar cane preparatory to extracting the juice therefrom consisting in depositing the cane in a fluid, rotating or rumbling the cane to wash the same and remove all foreign matter by contact of the stalks with one another, discharging the stalks from the fluid, cutting the cleansed stalks into short lengths, and subsequently converting the short lengths of stalks into a hay-like fibrous mass.

In testimony whereof, I have signed this specification.

WILLIAM HENRY MORGAN, Sr.